(12) United States Patent
Schiegg et al.

(10) Patent No.: US 12,477,312 B2
(45) Date of Patent: Nov. 18, 2025

(54) METHODS AND APPARATUSES FOR V2X COMMUNICATION

(71) Applicant: Robert Bosch GmbH, Stuttgart (DE)

(72) Inventors: Florian Alexander Schiegg, Hildesheim (DE); Ignacio Llatser Marti, Hildesheim (DE); Khaled Shawky Hassan, Laatzen (DE); Klaus Sambale, Oberhausen (DE); Nadia Brahmi, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 634 days.

(21) Appl. No.: 17/652,976

(22) Filed: Mar. 1, 2022

(65) Prior Publication Data

US 2022/0295246 A1    Sep. 15, 2022

(30) Foreign Application Priority Data

Mar. 12, 2021 (EP) .................................... 21162351

(51) Int. Cl.
*H04W 4/40* (2018.01)
*H04L 1/00* (2006.01)
(Continued)

(52) U.S. Cl.
CPC ............. *H04W 4/40* (2018.02); *H04L 1/0023* (2013.01); *H04L 1/1607* (2013.01); *H04W 4/06* (2013.01);
(Continued)

(58) Field of Classification Search
CPC ..... H04W 4/40; H04W 72/569; H04W 4/021; H04W 4/026; H04W 4/027; H04W 4/12;
(Continued)

(56) References Cited

U.S. PATENT DOCUMENTS

| 2019/0313359 A1* | 10/2019 | Lee ........................ H04W 76/14 |
| 2020/0045517 A1* | 2/2020 | Park ........................ H04W 4/12 |

(Continued)

FOREIGN PATENT DOCUMENTS

| WO | 2020064304 A1 | 4/2020 |
| WO | 2020194049 A1 | 10/2020 |

OTHER PUBLICATIONS

"TransAid D5.1 Definition of V2X message sets," Transition Areas for Infrastructure-Assisted Driving, V2.0, 83 Pages, Aug. 31, 2019. (Year: 2019).*

*Primary Examiner* — Brian J. Gillis
*Assistant Examiner* — Chhian (Amy) Ling
(74) *Attorney, Agent, or Firm* — NORTON ROSE FULBRIGHT US LLP

(57) ABSTRACT

A method for V2X communication. The method includes transmitting, via at least one V2X radio channel, at least one first V2X message object; receiving, via the at least one V2X radio channel, at least one feedback associated with a reception status of the at least one first V2X message object; deciding, based on the at least one feedback, whether to transmit at least one second V2X message object; and transmitting, via the at least one V2X radio channel, the at least one second V2X message object, if the decision indicates that the at least one second V2X message object is to be transmitted.

16 Claims, 5 Drawing Sheets

(51) Int. Cl.

| | |
|---|---|
| *H04L 1/1607* | (2023.01) |
| *H04W 4/06* | (2009.01) |
| *H04W 4/12* | (2009.01) |
| *H04W 4/44* | (2018.01) |
| *H04W 4/46* | (2018.01) |
| *H04W 28/26* | (2009.01) |
| *H04W 72/566* | (2023.01) |
| *H04W 4/02* | (2018.01) |
| *H04W 4/021* | (2018.01) |

(52) U.S. Cl.
CPC ............... *H04W 4/12* (2013.01); *H04W 4/44* (2018.02); *H04W 4/46* (2018.02); *H04W 28/26* (2013.01); *H04W 72/569* (2023.01); H04W 4/021 (2013.01); H04W 4/026 (2013.01); H04W 4/027 (2013.01)

(58) Field of Classification Search
CPC ........... H04W 4/46; H04W 4/44; H04W 4/06; H04W 28/26; H04L 1/1607; H04L 1/0023
See application file for complete search history.

(56) References Cited

U.S. PATENT DOCUMENTS

| | | | |
|---|---|---|---|
| 2020/0127793 A1* | 4/2020 | Kim | H04L 5/0055 |
| 2020/0267517 A1* | 8/2020 | el Essaili | H04L 61/4511 |
| 2020/0304969 A1* | 9/2020 | Basu Mallick | H04L 5/0055 |
| 2021/0160849 A1* | 5/2021 | Sun | H04W 72/23 |
| 2021/0314124 A1* | 10/2021 | Wu | H04L 1/1887 |
| 2022/0337348 A1* | 10/2022 | Hahn | H04L 5/0037 |
| 2024/0014978 A1* | 1/2024 | Ji | H04L 5/0094 |

* cited by examiner

METHODS AND APPARATUSES FOR V2X COMMUNICATION

CROSS REFERENCE

The present application claims the benefit under 35 U.S.C. § 119 of European Patent Application No. EP 21 16 2351.7 filed on Mar. 12, 2021, which is expressly incorporated herein by reference in its entirety.

BACKGROUND INFORMATION

There are provided advances in V2X communication.

Vehicle-to-infrastructure (V2I) and vehicle-to-vehicle (V2V) communication, together known as vehicle-to-X (V2X) communication allow vehicles and roadside units (RSUs) to directly "talk to each other" and exchange information wirelessly. The transmitted information can include for instance the vehicle's dynamics data, such as position and speed, or information about the vehicles' surroundings.

SUMMARY

A first aspect of the present invention is directed to a method. In accordance with an example embodiment of the present invention, the method comprises: transmitting, via at least one V2X radio channel, at least one first V2X message object that is associated with a V2X service type; receiving, via the at least one V2X radio channel, at least one feedback associated with a reception status of the at least one first V2X message object; deciding, based on the at least one feedback, whether to transmit at least one second V2X message object that is associated with the service type; and transmitting, via the at least one V2X radio channel, the at least one second V2X message object that is associated with the service type, if the decision indicates that the at least one second V2X message object is to be transmitted.

Promising applications of V2X communication comprises enhancements for driver assistance and automated driving systems by means of cooperative driving functions. Technologies such as collective perception, i.e., sharing detected objects by the vehicles' on-board sensors among neighboring vehicles, and maneuver coordination, based on the exchange of future vehicle trajectories, allow vehicles to cooperate with each other, leading to a higher level of safety, driver comfort and traffic efficiency.

The transmission of additional V2X messages for cooperative driving could lead to an increased load in the V2X radio channel, since the frequency spectrum reserved to V2X communications is limited. A channel congestion generally leads to a decreased communication performance, i.e. higher packet error rate and communication latency.

In order to prevent the channel to become saturated, the proposed scheme in accordance with the present invention takes into account feedback from the recipients when transmitting message objects over the air in order to maintain network stability, throughput efficiency and fair resource allocation to the network stations.

The feedback about received V2X messages of a certain V2X service type allows sender stations to accurately estimate the dynamic channel reliability. The improved estimation of the channel reliability allows sender stations to better use the V2X channel: sender stations transmit data more frequently whenever the channel reliability is low and, vice versa, transmit data less frequently whenever the channel reliability is high in order to reduce the channel load.

According to an advantageous example embodiment of the present invention, the deciding comprises: determining at least one reception indicator based on the at least one received feedback.

According to an advantageous example embodiment of the present invention, the deciding comprises: mapping, in particular based on a previously determined transmission priority, the at least one reception indicator to a present transmission priority of the at least one second V2X message object, in particular of the service type; and scheduling the transmitting of the at least one second V2X message object based on the determined transmission priority.

Advantageously, the mapping and scheduling provides a distributed and adaptive control of the transmission of V2X message objects.

According to an advantageous example embodiment of the present invention, the method comprises: selecting at least one of a plurality of second V2X message objects for the transmission if the present transmission priority associated with the respective second V2X message object is above a priority threshold.

Advantageously, this threshold-based selection allows for flexibly prioritizing message objects over others.

According to an advantageous example embodiment of the present invention, the method comprises: determining the priority threshold based on the received feedback, in particular based on the at least one reception indicator.

The dynamic value of the priority threshold allows controlling the transmission of the second V2X message object in a distributed manner.

According to an advantageous example embodiment of the present invention, the method comprises: determining a number of intended recipients for the at least one first V2X message object from a plurality of available recipients in a vicinity; determining a number of feedbacks associated with the reception status of the at least one first V2X message object or of a transmitted V2X message that is associated with or carries the at least one first V2X message object; and determine the at least one reception indicator based on the number of expected recipients and based on the number of feedbacks.

Advantageously, a ratio can be determined in the sense of the reception indicator providing a measure for the coverage of the transmitted message object.

According to an advantageous example embodiment of the present invention, the at least one feedback is a positive or negative acknowledgement.

Advantageously, the sender may send to the upper layers every ACK or NACK associated with the associated process ID. In this case, the sender application layer will be informed with the feedback, for example from a Hybrid Automatic Repeat Request (HARQ) process, associated with the first V2X message object.

According to an advantageous example embodiment of the present invention, the determination of the reception indicator is made for a plurality of V2X service types.

Then the transmitted messages of the plurality of V2X services types can be used for the estimation. For example, if 40% of the CAMs, DENMs and CPMs are received, then the sender assumes that the first V2X message object was also received with a probability of 40%.

According to an advantageous example embodiment of the present invention, the determining of the at least one reception indicator comprising: determining a comparison of a number of positive acknowledgements with a number of negative acknowledgements; and determining the at least one reception indicator based on the comparison.

The sender evaluates the amount of success and unsuccessful and, hence, it computes a percentage of HARQ-ACK and HARQ-NACKs. Based on this amount, the upper layer adapts the transmission priority and/or priority threshold.

According to an advantageous example embodiment of the present invention, the at least one feedback is a negative acknowledgement, and the determining of the at least one reception indicator comprising: determining a positive acknowledgement after a lapse of a period of time starting with the transmission of the associated first V2X message object.

Advantageously, the sender transmits to the upper layers unsuccessful/negative acknowledgements NACK. Thus, if the upper layer does not receive a NACK for a period of time, the sender assumes ACK in between.

According to an advantageous example embodiment of the present invention, the method comprises: determining a reduced reliability of the at least one V2X channel based on the at least one feedback associated with the at least one first V2X message object of of a transmitted message associated with the at least one first V2X message object, in particular based on the at least one reception indicator; and increasing the transmission priority associated with the at least one second V2X message object.

Advantageously, a transmission frequency for the at least one second V2X message object is increased.

According to an advantageous example embodiment of the present invention, the method comprises: determining an increased reliability of the at least one V2X channel based on the at least one feedback associated with the at least one first V2X message object, in particular based on the at least one reception indicator; and reducing, upon the determination of the increased reliability, the transmission priority associated with the at least one second V2X message object.

Advantageously, the transmission frequency for the at least one second V2X message object is decreased.

According to an advantageous example embodiment of the present invention, the first and second V2X message object comprise at least one of the following: a planned trajectory of an associated vehicle; a detected physical object information in the vicinity of the associated vehicle or of another vehicle; and information received via a satellite signal.

According to an advantageous example embodiment of the present invention, the at least one V2X radio channel for the transmitting of the at least one first V2X message object and the transmitting of the at least one second V2X message object is a V2X broadcast radio channel or a V2X multicast radio channel.

Advantageously, feedback is provided for a V2X message object transmitted via broadcasted V2X messages. For example, the feedback may include a flag indicating a measure of the current channel load or channel reliability, as measured by the feedback sender. This feeback may help the sender to improve its estimation of the current channel state.

DETAILED DESCRIPTION OF EXAMPLE EMBODIMENTS

Figure 1:
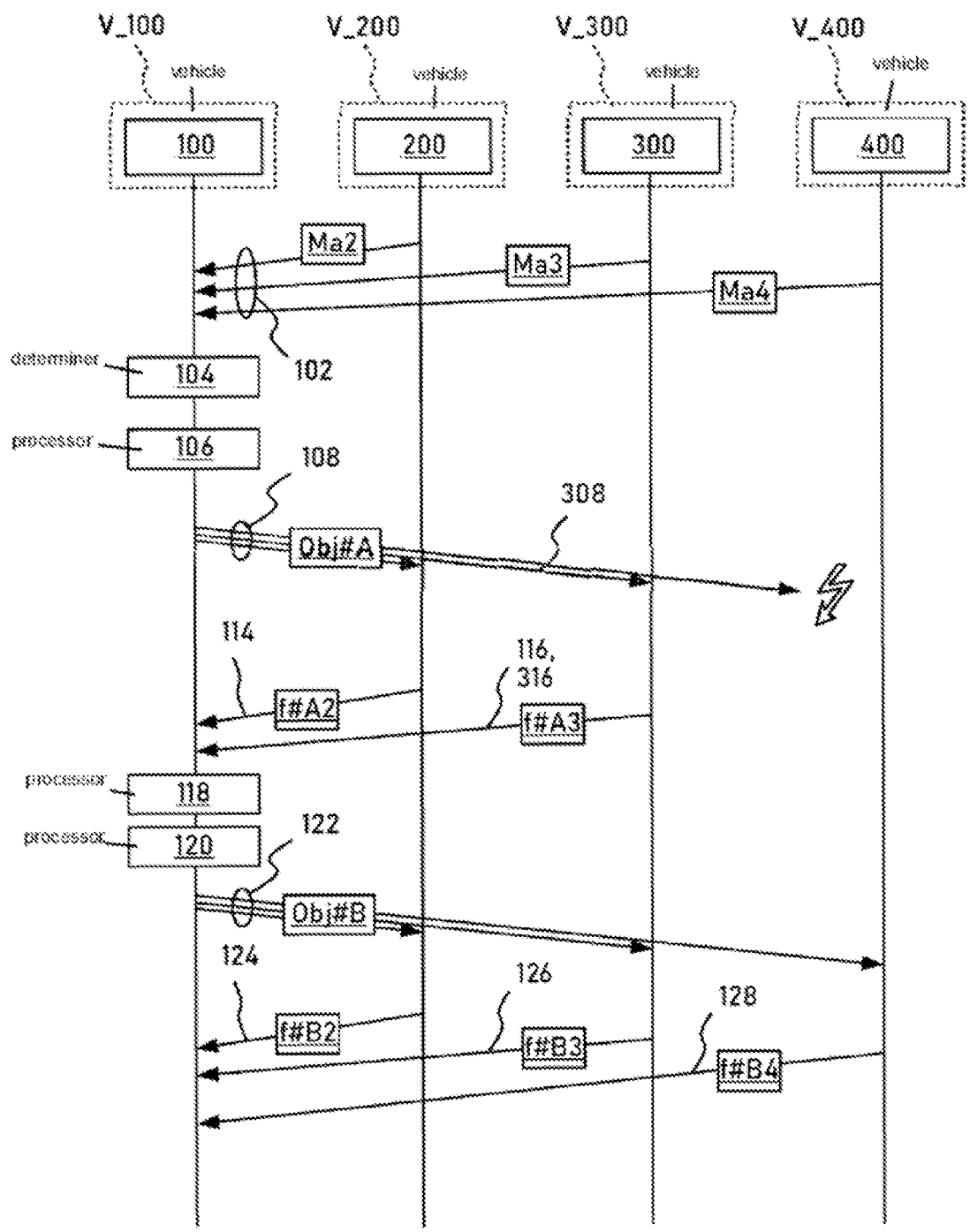
FIG. 1 depicts a schematic sequence diagram in accordance with an example embodiment of the present invention.

FIG. 1 depicts a schematic sequence diagram. An apparatus 100 comprises receiving means (i.e., receiver) 102 configured to receive V2X messages Ma2, Ma3, Ma4 from apparatuses 200, 300, 400 in the vicinity of the apparatus 100. Determining means 104 inspect the header of the messages Ma2, Ma3, Ma4 and determines the number of apparatuses in the vicinity of the apparatus 100, presently three apparatuses.

Determining or processing means 106 determine at least a first V2X message object Obj #A of a service type. Depending on the service type, the message object Obj #A is a planned trajectory of the vehicle V_100, a representation of a detected physical object or another V2X payload data for V2X communication.

Transmitting means (i.e., transmitter) 108 transmit, via at least one V2X radio channel, the at least one first V2X message object Obj #A that is associated with a V2X service type;

Receiving means (i.e., receiver) 308 of the apparatus 300 receive, via at least one V2X radio channel, the at least one first V2X message object Obj #A. The receiving means 308 are able to determine a status of the reception. That is, the receiving means 308 can positively acknowledge and/or negatively acknowledge the reception of the first V2X message object Obj #A or of the associated V2X message via the feedback f #A3.

Transmitting means (i.e., transmitter) 316 of the apparatus 300 transmit, via the at least one V2X radio channel, the at least one feedback f #A3 associated with the reception status of the at least one first V2X message object Obj #A. For example, instead of the V2X radio channel, on which the first message object Obj #A was transmitted, a further dedicated V2X control channel can be used to transmit the feedback f #.

Receiving means (i.e., receivers) 114, 116 receive, via the at least one V2X radio channel, the at least one feedback f #A2, f #A3 associated with a reception status of the at least one first V2X message object Obj #A.

Determining or processing means 118 determine at least a second V2X message object Obj #B of the service type as that of the first V2X message object.

Decision or processing means 120 decide, based on the at least one feedback f #A2, f #A3, whether to transmit the at least one second V2X message object Obj #B that is associated with the service type.

In the shown case, the apparatus 400 is not able to receive the first V2X message object Obj #A. That is, the deciding means 120 detects that one of the known recipients in the vicinity was not able to receive the first V2X message object. Accordingly, a retransmission of information that is associated with the type of the first V2X message Obj #1 is triggered as shown in the following.

In other words, V2X message generation rules are changed based on the received feedback f # associated with the first V2X message object. Of course, the feedback f # can also associated with a respective transmitted V2X message. However, as the transmitted V2X message transports the first V2X message object. Hence, there is the association between the first V2X message object and the feedback f # via the transport medium, the transmitted V2X message.

For example, the number of received acknowledgements for a given transmitted V2X message and the at least one first V2X message object associated therewith allows the sender apparatus 100 to calculate a node coverage ratio for the transmitted first V2X message or the associated first V2X message object, which provides an estimation of the channel reliability. The sender apparatus 100 then considers this estimated channel reliability in the generation rules of the transmitted V2X message type. For example, if the estimated channel reliability decreases, the transmission priority of this message type is increased (i.e. the message transmission frequency increases), and vice versa.

Therefore, the provided scheme considers the feedback provided by the intended receiver apparatuses 200, 300, 400 of a V2X message object or the associated type to determine when and how often a message object of the same type should be generated and transmitted.

Transmitting means (i.e., transmitter) 122 transmit, via a transmission opportunity on the at least one V2X radio channel, the at least one second V2X message object Obj #B that is associated with the service type, if the decision indicates that the at least one second V2X message object Obj #B is to be transmitted.

Receiving means (i.e., receivers) 124, 126, 128 receive a respective feedback f #B2, f #B3, f #B4 in response to the transmitted second message object Obj #B. If all feedbacks f #B2, f #B3, f #B4 indicate a positive acknowledgement of receipt, the apparatus 100 will decrease a transmission priority for message objects of the V2X service type as that of the first and second message object Obj #1, Obj #B.

The apparatus 100, 200, 300, 400 is associated with or is part of a corresponding vehicle V_100, V_200, V_300, V_400. Although inter-vehicle communication is explained in this description, the communication schemes also apply to other communication partners like vulnerable road users or infrastructure nodes.

Vehicle-to-vehicle V2V and vehicle-to-infrastructure communications are summarized under Vehicle-to-Everything V2X communication. A V2X message object can be part of a V2X message transmitted over the associated V2X radio channel. For establishing the V2X radio channel, there are different technologies available like IEEE 802.11p or cellular V2X like 5G (NR) V2X and 4G (LTE) V2X. Also an extension of IEEE 801.11p as 11bd for V2X is available.

According to an example, the first and second V2X message objects Obj #1, Obj #2 comprise at least one of the following: a planned trajectory of an associated vehicle; a detected physical object information in the vicinity of the associated vehicle or of another vehicle; information received via a satellite signal.

According to an example, the at least one V2X radio channel for the transmitting of the at least one first V2X message object and the transmitting of the at least one second V2X message object is a V2X broadcast radio channel. Other examples use a unicast or groupcast V2X radio channel instead.

For providing the feedback f # to upper layers, there are several options to consider. For example, once the first V2X message is transmitted be received by an appropriate receiver, either an ACK or a NACK is feedback again, i.e., from the Rx apparatus 300 to the Tx apparatus 100. Accordingly, the TX apparatus 100, upon a successful reception of acknowledgements will do one or more of the following options: The Tx apparatus 100 passes its upper layers a field for upper layer feedback, which could be: One bit, e.g., if "0" then no NACKs, if one then at least 1 or more NACKs received; a toggling bit, e.g., if "0" and stays "0" on the next transmission was not changed; if switched to "1" then NACK is indicated; more bits, e.g. 2, "00"→no NACKS, "01"→25% NACKs.

The apparatus 100, 200, 300, 400 comprises at least one processor, at least one memory including computer program code, and at least one communication module that is coupled with at least one antenna. The at least one memory and computer program code are configured, with the at least one processor, and the at least one communication module, to cause the apparatus 100, 200, 300, 400 at least to operate according to the present description.

Figure 2:
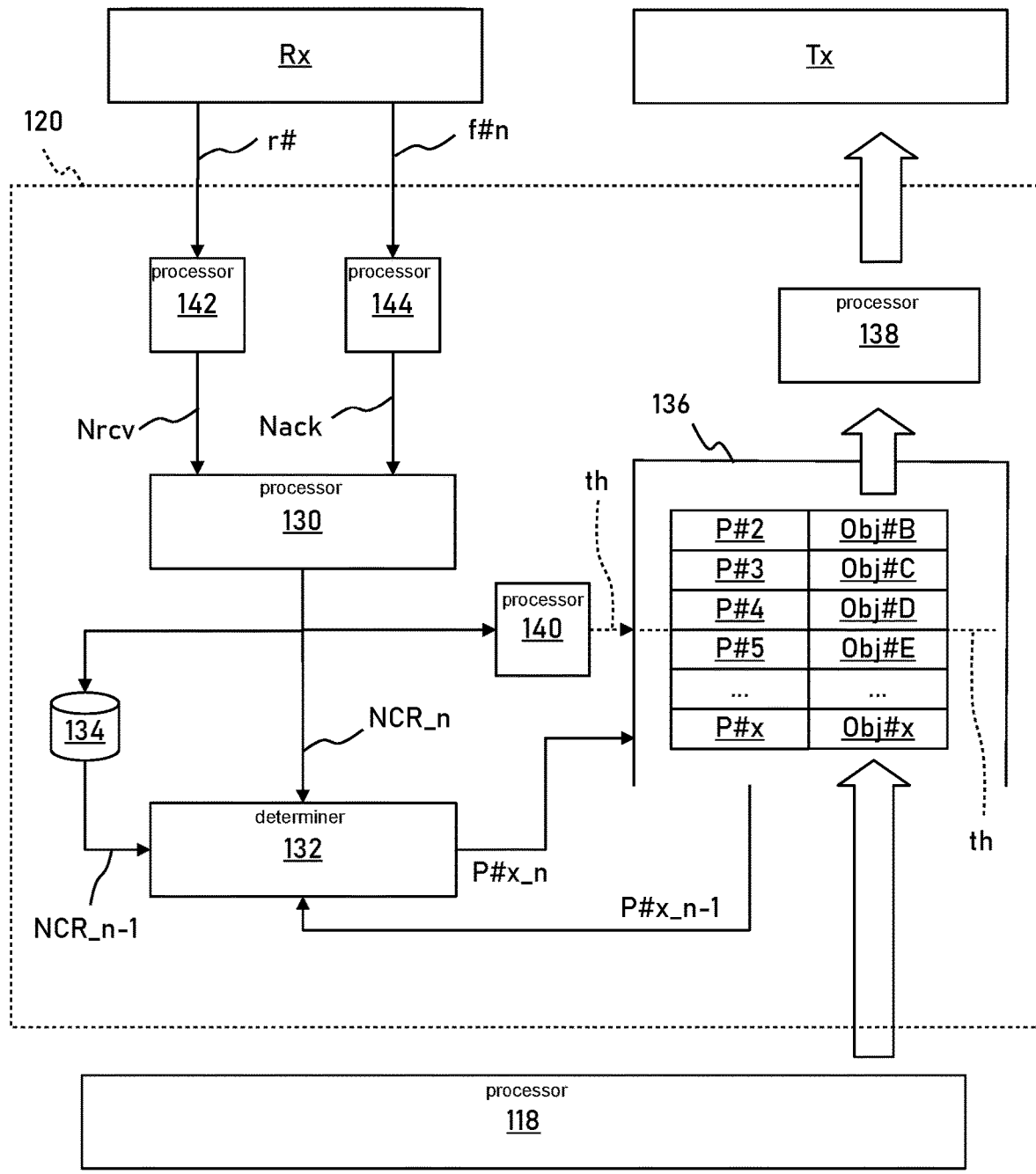
FIG. 2 depicts a schematic block diagram of an apparatus, in accordance with an example embodiment of the present invention.

FIG. 2 depicts a schematic block diagram of the apparatus 100. A receiver Rx provides received V2X messages or parts thereof. A transmitter or sender Tx transmits V2X message objects encapsulated in V2X messages over the at least one V2X radio channel. The content of the V2X message objects is provided by the determining means 118.

Determining or processing means 142 determine a number Nrcv of intended recipients for the at least one first V2X message object Obj #1 from a plurality of available recipients r # in a vicinity. In other words, for the transmitted first V2X message object, the sender apparatus 100 calculates the number of expected receivers Nrcv. In the case of a unicast message, Nrcv=1. In the case of a groupcast message, Nrcv is obtained from the message header. In the case of a broadcast message, Nrcv is estimated as the number of ITS stations within V2X communication range in the sender station's environmental model, for which the message is estimated to be relevant.

Determining or processing means 144 determine a number Nack of feedbacks f #n associated with the reception status of the at least one first V2X message object Obj #1.

Determine or processing means 130 determine the at least one reception indicator NCR_n based on the number of expected recipients Nrcv and based on the number Nack of feedbacks. For example, the sender apparatus 100 estimates the at least one reception indicator NCR_n in form of node coverage ratio, NCR for the transmitted first V2X message objects as NCR_n=Nack/Nrcv.

Of course, also other forms of reception indicators and determination methods are possible as outlined in the following.

According to an example, the at least one feedback f #n is a positive or negative acknowledgement. That is, a plurality of feedbacks f #n can comprise positive and negative acknowledgements.

The determining means 132 for determining the at least one reception indicator NCR_n comprises: determining or processing means for determining a comparison of a number of positive acknowledgements with a number of negative acknowledgements, and determining or processing means for determining the at least one reception indicator NCR_n based on the comparison.

According to an example, the at least one feedback f # is a negative acknowledgement, and the determining means 132 for determining the at least one reception indicator NCR_n comprises: determining or processing means for determining a positive acknowledgement after a lapse of a period of time starting with the transmission of the associated first V2X message object Obj #1.

The decision means 120 comprises determining or processing means 130 for determining at least one reception indicator NCR_n based on the at least one received feedback f #n. Mapping or processing means 132 map, in particular based on a previously determined transmission priority P #x_n−1 that is stored in a memory 134, the at least one reception indicator NCR_n to a present transmission priority P #x_n of the at least one second V2X message object Obj #B, in particular of the service type. The mapping means can apply a linear function, that is that the transmission priority increases linear over time. Of course, other mapping functions different from the linear function are available. According to an example, for different V2X service types different functions apply.

Determining or processing means 140 determine the priority threshold th based on the received feedback f #n, in particular based on the at least one reception indicator NCR_n. According to another example, the priority threshold is fixed.

Scheduling or processing means 136, for example via a queue, schedule the transmitting 122 of the at least one second V2X message object Obj #2 based on the determined transmission priority P #x_n. The scheduling means 136 store a plurality of V2X message objects Obj #B to Obj #x. Transmission priorities P #2 to P #X are associated with the V2X message objects Obj #B to Obj #x. According to a priority order, the V2X message objects Obj #B to Obj #x are sorted based on the associated transmission priority P #2 to P #X.

Selecting or processing means 138 select at least one of a plurality of second V2X message objects Obj #2 for the transmission from the scheduling means 136, if the present transmission priority P #1 associated with the respective second V2X message object Obj #2 is above a priority threshold th. The selecting means 138 selects, for example, the message objects Obj #B to Obj #C for a transmission, as their associated transmission priority P #2 to P #4 is above the threshold th.

Scheduling means 136 and selecting means 138 are part of the message generation rules. Based on the reception indicator NCR_n, optionally also on its time dependency (e.g., comparison of current NCR with past NCR), the sender apparatus 100 adapts the generation rules for messages according to the respective V2X service type. For example, if the reception indicator NCR_n is high (or has increased with respect to a previous value), the V2X channel has an estimated high (higher) reliability. The transmission priority of this V2X service type is then decreased (i.e., messages or message objects of this type are transmitted less frequently), in order to reduce the channel load caused by the transmission of this message type. If the reception indicator NCR_n is low (or has decreased with respect to a previous value), the V2X channel has an estimated low (lower) reliability. This could happen, e.g., in an urban intersection, where the wireless signal propagation is blocked by obstacles, such as buildings and vehicles. The transmission priority of this V2X service type and the associated message objects is then increased (i.e. messages of this type are transmitted more frequently). In this way, the probability for expected receivers of receiving the V2X message timely is increased.

Figure 3:
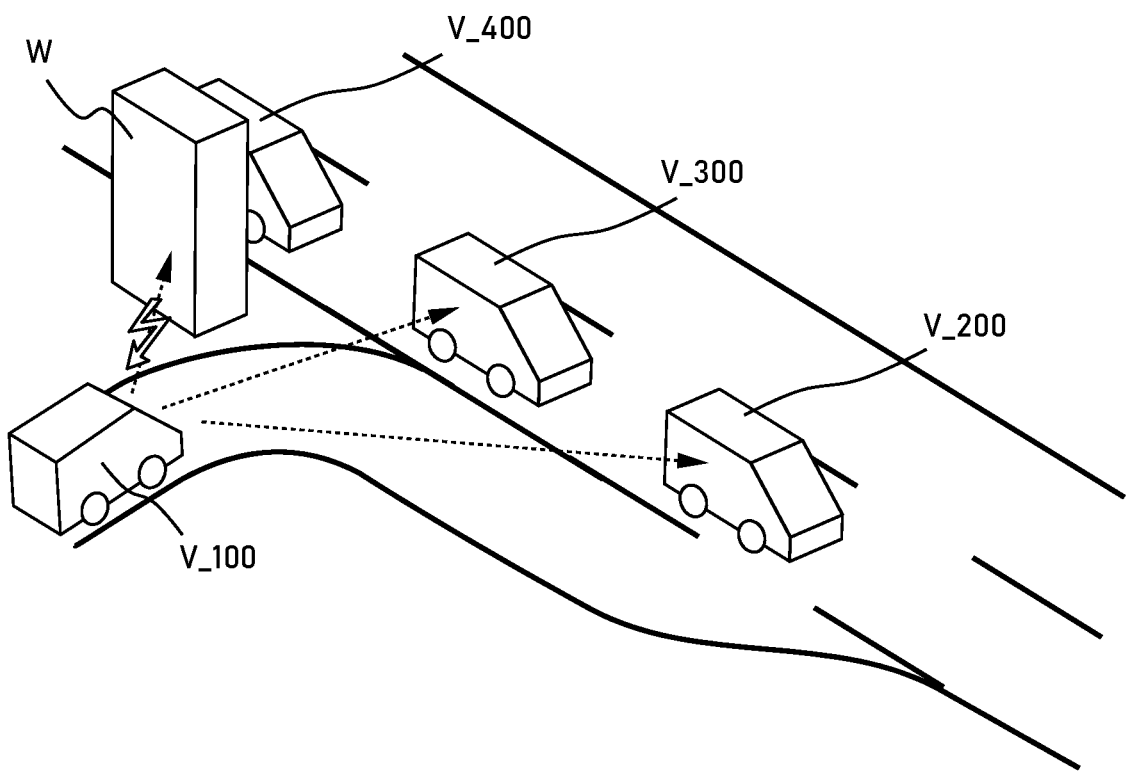
FIGS. 3 and 4 each depict schematically a road situation.

FIG. 3 depicts an exemplary highway merging scenario, where the merging vehicle V_100 is broadcasting Cooperative Awareness Messages (CAM), which is an exemplary V2X service type. In this example, the CAM sent by the merging vehicle V_100 is received by V_200 and V_300, but not by V_400, e.g. due to channel fading caused by a wall W near the highway ramp.

Figure 4:
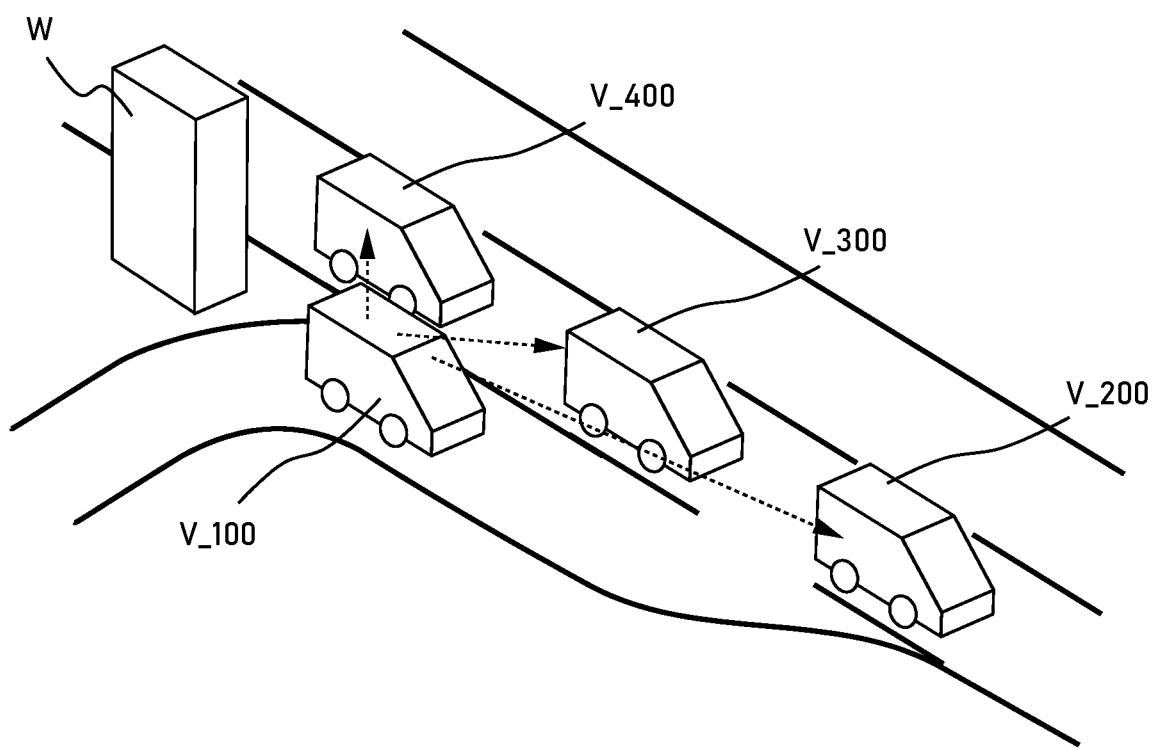

FIG. 4 shows the scenario of FIG. 3 a moment later. Vehicles V_200 and V_300 have sent an acknowledgement of having received the CAM to the merging vehicle V_100, whereas V_400 did not. The node coverage ratio for this CAM transmission is calculated as ⅔. The CAM is especially relevant for V_400, since its current trajectory is leading towards the merging area. V_400 is therefore not able to cooperate with the merging vehicle to facilitate its merging maneuver, e.g. by changing to the left lane. In order to enable V_400 to receive the CAM as soon as possible, the merging vehicle V_100 increases the transmission priority of its next CAM, thereby reducing the time interval between future CAM transmissions. As soon as the merging vehicle V_100 receives an acknowledgement for a transmitted CAM, it reduces again its CAM transmission priority. The proposed mechanism thus allows to increase the probability that all expected receivers actually receive the message while keeping the additionally caused channel load at a reduced level.

If the transmitted V2X message consists of at least one or a number of message objects (e.g., detected objects in a Collective Perception Message, or vehicle trajectories in a Maneuver Coordination Message), the feedback-based message generation rules can include at least one of the following techniques.

The received feedback f # is used by the sender apparatus 100 to assign an individual transmission priority P # of FIG. 2 to each message object. This can be achieved by calculating the number of expected receivers per message object, considering the stations for which the respective message object is estimated to be relevant. For example, a detected object in a Collective Perception Message, CPM, is relevant to stations located in the same road or driving towards the object, but not relevant to stations located in a different road and driving away from the object. Then the determined new priority is assigned to the message objects of the associated V2X service type.

The received feedback f # is be used by the sender apparatus 100 to adapt the priority threshold th of FIG. 2, which determines the minimum priority that message objects must have in order to be included in the generated V2X message that is transmitted over the V2X radio channel. For example, the proposed scheme sets the priority threshold based on the channel busy ratio as an estimation of the node coverage ratio. The priority threshold can be set based on the received feedback, which allows a more accurate estimation of the node coverage ratio.

The proposed feedback-based transmission priorities are not limited to distributed systems and may well form part of centralized networks too. An example is the Signal Phase and Timing (SPAT) service, where traffic participants are informed by the infrastructure about the traffic light phases, among others. The messages are continuously broadcasted to traffic participants in the vicinity. However, should the infrastructure obtain feedback about positive receptions by the receiving stations could stop the transmission once all relevant stations have been successfully informed, thus lowering the V2X channel load. With environmental changes (e.g., new stations entering the relevant area), new SPAT messages would have to be transmitted until the relevant information reached the new addressees.

Figure 5:
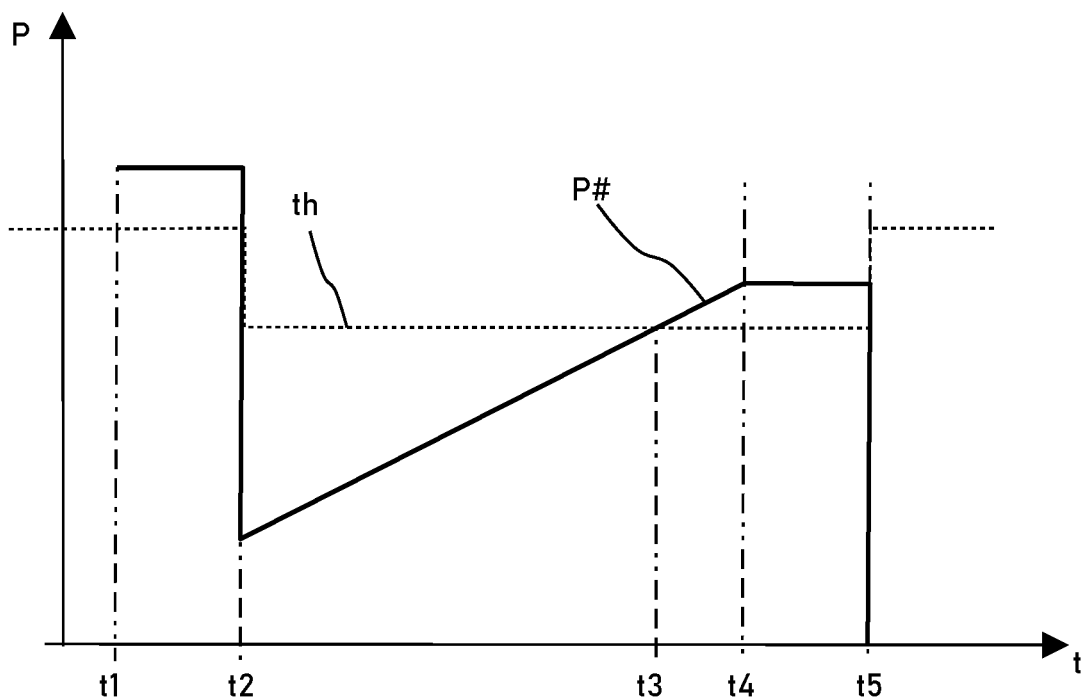
FIG. 5 depicts schematically a temporal change of a transmission priority, in accordance with an example embodiment of the present invention.

FIG. 5 depicts schematically a temporal change of a transmission priority P # in the example of FIGS. 3 and 4. At the point in time T1, the apparatus 100 has transmitted the first V2X message object and is expecting the feedback from the other apparatuses 200 to 400. At the point in time t2, the apparatus 100 has received the feedbacks in form of positive acknowledgements from the apparatuses 200 and 300. As the feedback from the apparatus 400 is missing, the apparatus 100 reduces the transmission priority P for the V2X service type associated with the transmitted first message object to a value above zero. This results in an earlier re-transmission of the second V2X message object that has the V2X service type of the first V2X message.

Moreover, the threshold th for selecting the message objects based on the transmission priority P # is reduced at the point in time t2. This measure also decreases the time period for the transmission of message objects of the respective V2X service type.

Between the point in time t2 and the point in time t4, the transmission priority P increases in the linear form over time t. At the point in time t3, the transmission priority P # passes the threshold th. So, after the point in time t3, the second V2X message object associated with the transmission priority P # is selected for a transmission. At the point in time t4, the second V2X message object is transmitted. Between the point in time t4 and the point in time t5, the apparatus 100 is waiting for the feedback. At the point in time t5, the apparatus 100 determines based on the received feedback, that the intended receivers in form of the apparatuses 200, 300 and 400 have received the message, the transmission priority P is set to Zero. At the point in time t5, the threshold th is increased to the level before the point in time t2. These measures increase the time period between the transmission of message objects associated with the same V2X service type.

Figure 6:
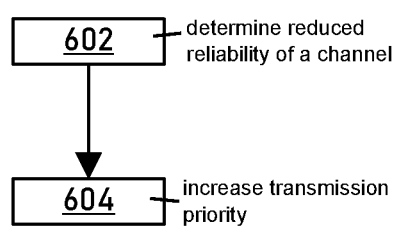
FIGS. 6 and 7 each depict a schematic flow diagram, in accordance with an example embodiment of the present invention.

FIG. 6 depicts a schematic flow diagram. Determining or processing means 602 determine a reduced reliability of the at least one V2X channel based on the at least one feedback f # associated with the at least one first V2X message object Obj #1, in particular based on the at least one reception indicator NCR_n. Increasing or processing means 604 increase the transmission priority P #2 associated with the at least one second V2X message object Obj #2, if the reduced reliability is determined.

Figure 7:
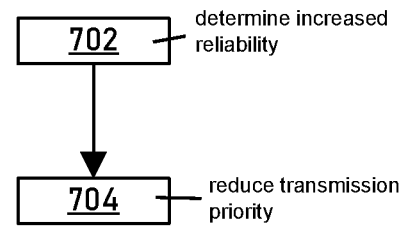

FIG. 7 depicts a schematic flow diagram. Determining or processing means 702 determine an increased reliability of the at least one V2X channel based on the at least one feedback f # associated with the at least one first V2X message object Obj #1, in particular based on the at least one reception indicator NCR_n. Reducing or processing means 704 reduce, upon the determination of the increased reliability, the transmission priority P #2 associated with the at least one second V2X message object Obj #2.

What is claimed is:

1. A method, comprising:
   transmitting, via at least one vehicle-to-x (V2X) radio channel, at least one first V2X message object that is associated with a V2X service type;
   receiving, via the at least one V2X radio channel, at least one feedback associated with a reception status of the at least one first V2X message object;
   deciding, based on the at least one feedback, whether to transmit at least one second V2X message object whose content is different than the at least one first V2X message object and that is associated with the V2X service type; and
   transmitting, via the at least one V2X radio channel, the at least one second V2X message object that is associated with the V2X service type, based on the decision indicating that the at least one second V2X message object is to be transmitted:
   wherein the first and second V2X message objects include any of the following three items (1)-(3) or any combination thereof:
   (1) at least one maneuver information, including a planned trajectory or an action indicator indicating a planned action like accelerating or braking, of an associated vehicle;
   (2) at least one detected physical object information in the vicinity of the associated vehicle or of another vehicle; and
   (3) at least one information received via a satellite signal.

2. The method according to claim 1, wherein the deciding includes determining at least one reception indicator based on the at least one received feedback.

3. The method according to claim 2, wherein the deciding includes:
   mapping, based on a previously determined transmission priority, the at least one reception indicator to a present transmission priority of the at least one second V2X message object of the V2X service type; and
   scheduling the transmitting of the at least one second V2X message object based on the present transmission priority.

4. The method according to claim 3, further comprising:
   selecting at least one of a plurality of second V2X message objects for the transmission in response to the present transmission priority associated with the respective second V2X message object being above a priority threshold.

5. The method according to claim 4, further comprising:
   determining the priority threshold based on the received feedback, including based on the at least one reception indicator.

6. The method according to claim 2, further comprising:
   determining a number of intended recipients for the at least one first V2X message object from a plurality of available recipients in a vicinity;
   determining a number of feedbacks associated with the reception status of the at least one first V2X message object; and
   determining the at least one reception indicator based on the number of expected recipients and based on the number (Nack) of feedbacks.

7. The method according to claim 2, wherein the at least one feedback is a negative acknowledgement, and the determining of the at least one reception indicator includes:
   determining a positive acknowledgement after a lapse of a period of time starting with the transmission of the associated first V2X message object.

8. The method according to claim 2, further comprising:
   determining that a reliability of the at least one V2X channel is below a predefined level based on the at least one feedback associated with the at least one first V2X message object, including based on the at least one reception indicator; and
   based on the determination regarding the reliability, increasing the transmission priority associated with the at least one second V2X message object.

9. The method according to claim 2, further comprising:
   determining that a reliability of the at least one V2X channel is above predefined level based on the at least one feedback associated with the at least one first V2X message object, including based on the at least one reception indicator; and
   based on the determination regarding the reliability, reducing the transmission priority associated with the at least one second V2X message object.

10. The method according to claim 1, wherein the at least one feedback is a positive or negative acknowledgement.

11. The method according to claim 10, the determining of the at least one reception indicator includes:
   determining a comparison of a number of positive acknowledgements with a number of negative acknowledgements; and
   determining the at least one reception indicator based on the comparison.

12. The method according to claim 1, wherein the at least one V2X radio channel for the transmitting of the at least one first V2X message object and the transmitting of the at least one second V2X message object is a V2X broadcast radio channel.

13. An apparatus, comprising:
   at least one transmitter, wherein the at least one transmitted is configured to transmit, via at least one vehicle-to-x (V2X) radio channel, at least one first V2X message object that is associated with a V2X service type;
   a receiver configured to receive, via the at least one V2X radio channel, at least one feedback associated with a reception status of the at least one first V2X message object; and
   a decision device configured to decide, based on the at least one feedback, whether to transmit at least one second V2X message object whose content is different than the at least one first V2X message object and that is associated with the service type;
   wherein:
      the at least one transmitter is configured to transmit, via the at least one V2X radio channel, the at least one second V2X message object that is associated with the service type, based on the decision indicating that the at least one second V2X message object is to be transmitted; and
      the first and second V2X message include objects any of the following three items (1)-(3) or any combination thereof:
         (1) at least one maneuver information, including a planned trajectory or an action indicator indicating a planned action like accelerating or braking, of an associated vehicle;
         (2) at least one detected physical object information in the vicinity of the associated vehicle or of another vehicle; and
         (3) at least one information received via a satellite signal.

14. A method, comprising:
   receiving, via at least one vehicle-to-x (V2X) radio channel, at least one first V2X message object that is especially associated with a V2X service type;
   transmitting, via the at least one V2X radio channel, at least one feedback associated with a reception status of the at least one first V2X message object; and
   receiving, via the at least one V2X radio channel, at least one second V2X message object whose content is different than the at least one first V2X message object, that is associated with the V2X service type, and that has been transmitted according to a transmission decision made based on the transmitted at least one feedback:
   wherein the first and second V2X message objects include any of the following three items (1)-(3) or any combination thereof:
      (1) at least one maneuver information, including a planned trajectory or an action indicator indicating a planned action like accelerating or braking, of an associated vehicle;
      (2) at least one detected physical object information in the vicinity of the associated vehicle or of another vehicle; and
      (3) at least one information received via a satellite signal.

15. An apparatus, comprising:
   a receiver; and
   a transmitter;
   wherein:
      the apparatus is configured to:
         receive, using the receiver and via at least one vehicle-to-x (V2X) radio channel, at least one first V2X message object that is associated with a V2X service type;
         transmit, using the transmitter and via the at least one V2X radio channel, at least one feedback associated with a reception status of the at least one first V2X message object; and
         receive, using the receiver and via the V2X radio channel, at least one second V2X message object whose content is different than the at least one first V2X message object, that is associated with the V2X service type, and that has been transmitted according to a transmission decision made based on the transmitted at least one feedback; and
      the first and second V2X message objects include any of the following three items (1)-(3) or any combination thereof:
         (1) at least one maneuver information, including a planned trajectory or an action indicator indicating a planned action like accelerating or braking, of an associated vehicle;
         (2) at least one detected physical object information in the vicinity of the associated vehicle or of another vehicle; and
         (3) at least one information received via a satellite signal.

16. A method, comprising:
   providing an apparatus that includes:
      at least one transmitter, wherein the at least one transmitter is configured to transmit, via at least one vehicle-to-x (V2X) radio channel, at least one first V2X message object that is associated with a V2X service type;
      a receiver configured to receive, via the at least one V2X radio channel, at least one feedback associated with a reception status of the at least one first V2X message object; and
      a decision device configured to decide, based on the at least one feedback, whether to transmit at least one second V2X message object whose content is different than the at least one first V2X message object and that is associated with the service type, wherein the at least one transmitter is configured to transmit, via the at least one V2X radio channel, the at least one second V2X message object that is associated with the service type, based on the decision indicating that the at least one second V2X message object is to be transmitted; and
   using the provided apparatus;
   wherein the first and second V2X message objects include any of the following three items (1)-(3) or any combination thereof:
      (1) at least one maneuver information, including a planned trajectory or an action indicator indicating a planned action like accelerating or braking, of an associated vehicle;

(2) at least one detected physical object information in the vicinity of the associated vehicle or of another vehicle; and
(3) at least one information received via a satellite signal.

\* \* \* \* \*